Dec. 20, 1955
E. SKILLMAN
2,727,801
COURSE RECORDER
Filed April 6, 1953
5 Sheets-Sheet 1
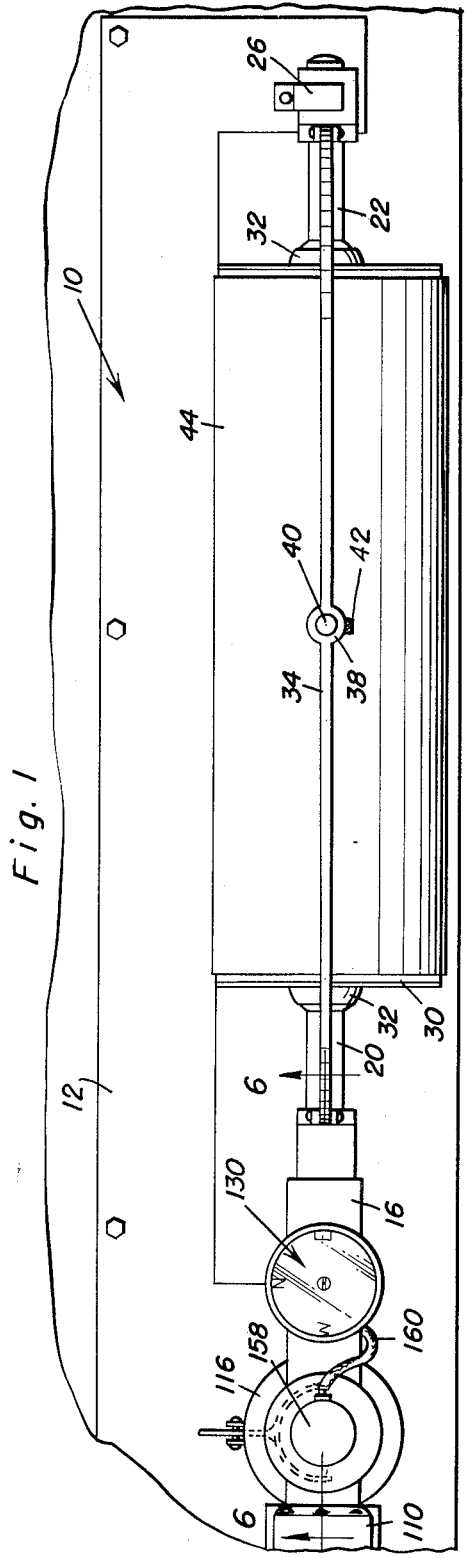
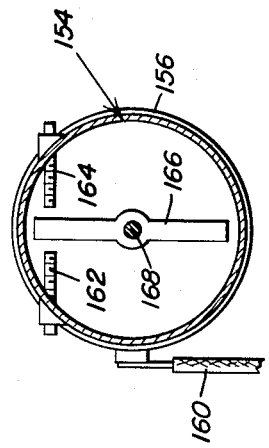
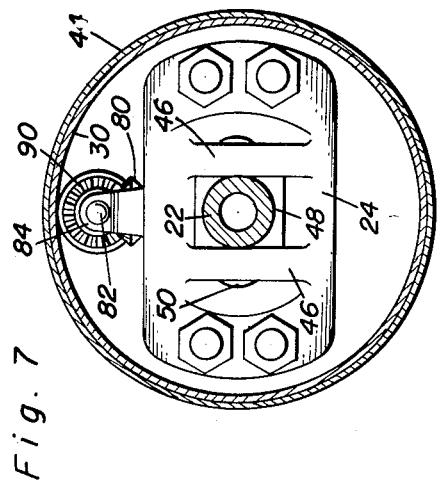
Edward Skillman
INVENTOR.

Dec. 20, 1955   E. SKILLMAN   2,727,801
COURSE RECORDER
Filed April 6, 1953   5 Sheets-Sheet 2
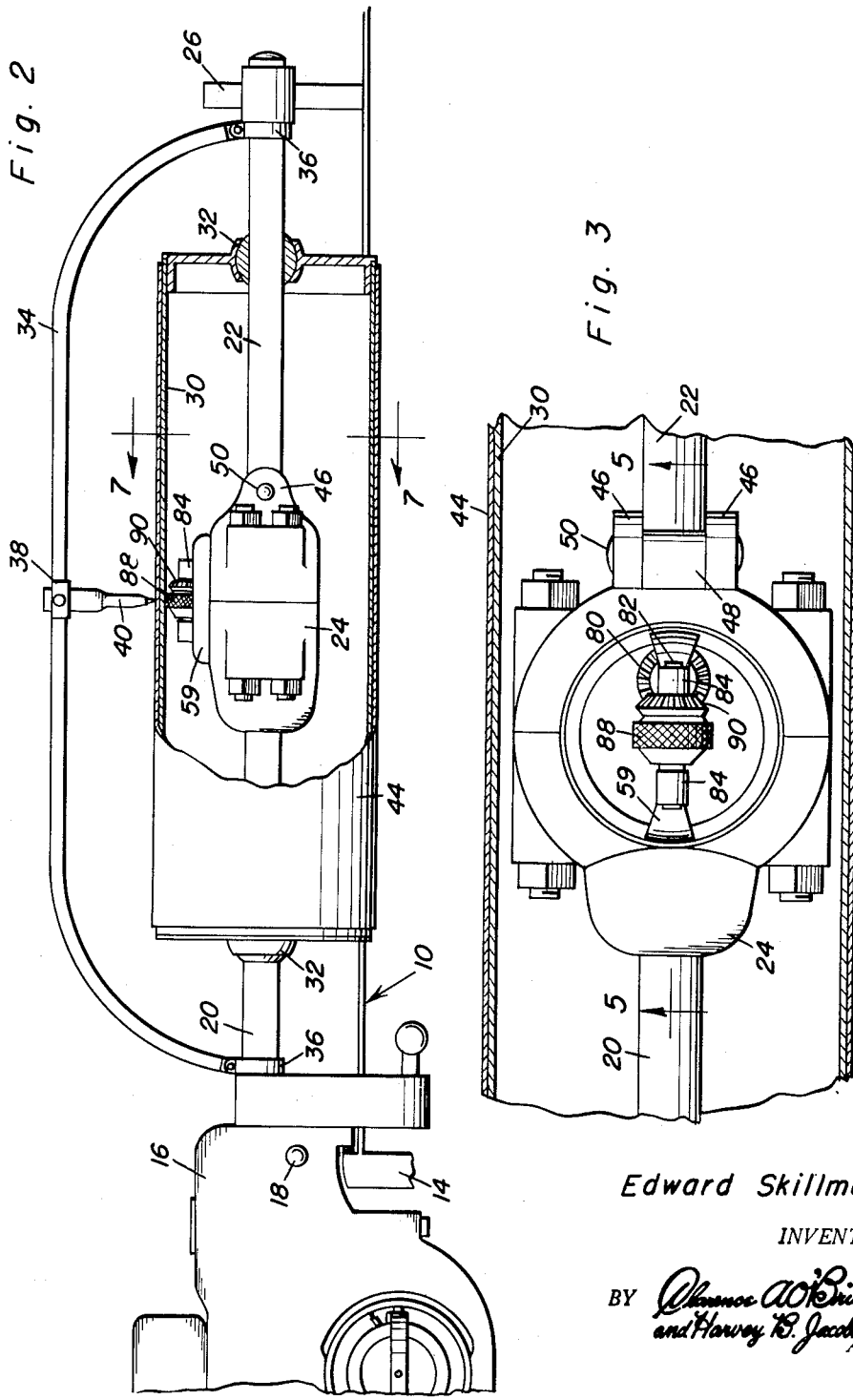
Edward Skillman
INVENTOR.

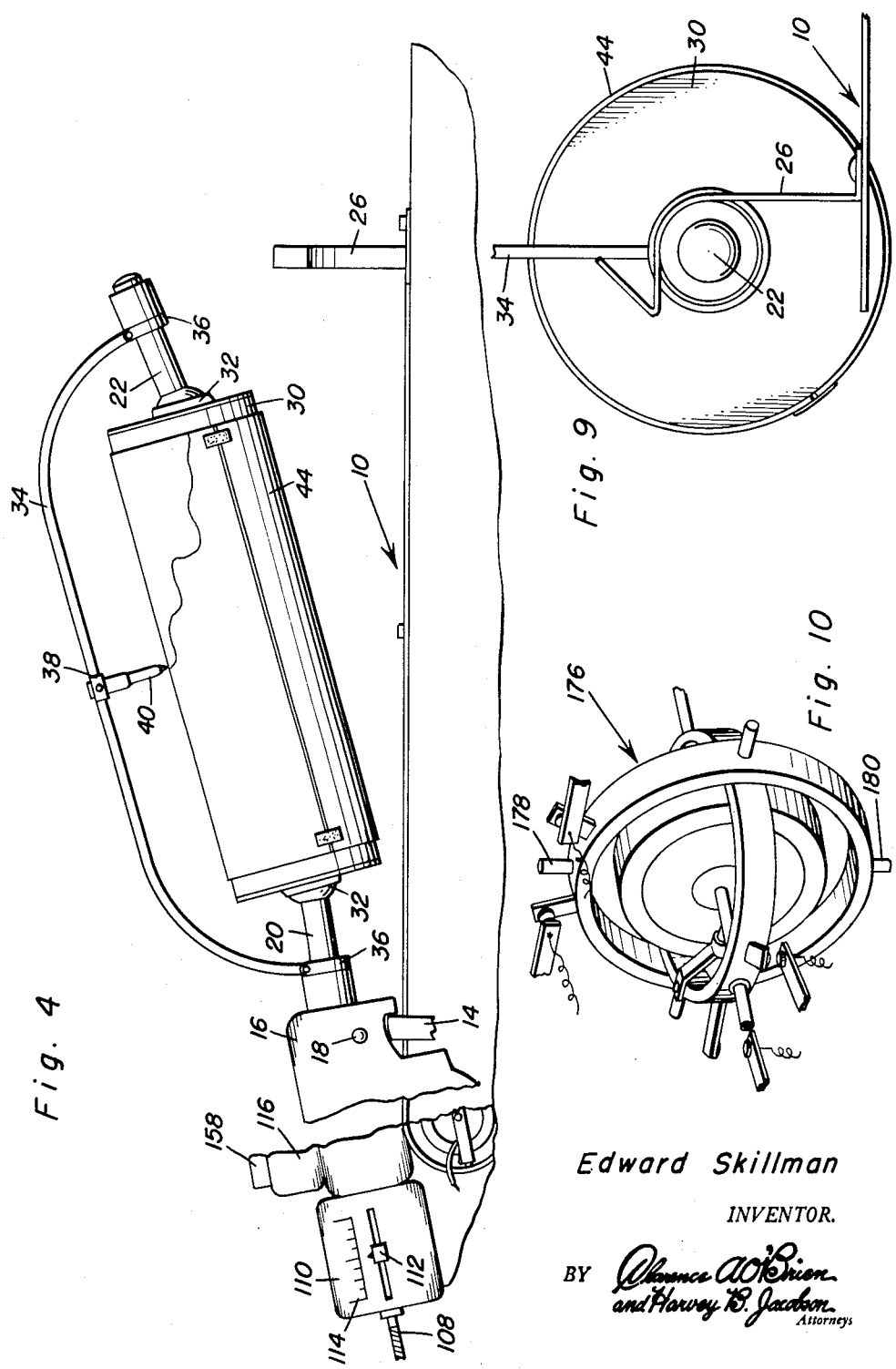

Dec. 20, 1955

E. SKILLMAN 2,727,801

COURSE RECORDER

Filed April 6, 1953

Edward Skillman
INVENTOR.

BY *Clarence A. O'Brien*
*and Harvey B. Jacobson*
Attorneys

Dec. 20, 1955  E. SKILLMAN  2,727,801
COURSE RECORDER

Filed April 6, 1953  5 Sheets-Sheet 5

Edward Skillman
INVENTOR.

BY Clarence A. O'Brien
and Harvey B. Jacobson
Attorneys

United States Patent Office 2,727,801
Patented Dec. 20, 1955

2,727,801

COURSE RECORDER

Edward Skillman, Enterprise, Kans.

Application April 6, 1953, Serial No. 346,880

6 Claims. (Cl. 346—8)

This invention relates to new and useful improvements in apparatus for tracing courses and the primary object of the present invention is to provide a course recorder for vehicles, boats, aircraft, and the like that will record the horizontal path of travel of the object on which it is mounted.

Another important object of the present invention is to provide a course recorder including a sheet holding cylinder that will be rotated and axially moved by novel and improved means so that a scriber held against the sheet on the outer periphery of the cylinder will trace the course being followed.

Yet another object of the present invention is to provide a course recording apparatus including a support having a spring raised cylinder holding portion that is retained in a horizontal position by a latch which when released will permit raising of the holding portion so that a sheet of paper may be quickly and readily applied to or removed from the cylinder in a convenient manner.

Another feature of the present invention is to provide a course recorder including a friction wheel engaging the inner periphery of the cylinder and carried by a vertically rotatable portion so that the cylinder may be moved axially and/or rotated.

Another feature of the present invention is to provide a course recorder of the aforementioned character embodying a direction controlled drive means for the vertically rotatable portion, whereby the sheet holding cylinder will be oriented as the object on which the recorder is mounted changes direction either gradually or abruptly.

A further object of the present invention is to provide a course recorder that is extremely small and compact in structure to permit the same to occupy very little space on the object on which it is mounted.

A still further aim of the present invention is to provide a course recorder that is simple and practical in construction, strong and reliable in use, inexpensive to manufacture, service and install, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the present invention;

Figure 2 is a front elevational view of Figure 1;

Figure 3 is an enlarged fragmentary view, partly in plan and partly in section of Figure 2;

Figure 4 is a view similar to Figure 2 but showing the cylinder raised so that the chart thereon may be removed;

Figure 7 is an enlarged transverse vertical sectional view taken substantially on the plane of section line 7—7 of Figure 2;

Figure 8 is an enlarged horizontal sectional view taken substantially on the plane of section line 8—8 of Figure 6;

Figure 9 is an enlarged end view of Figure 2; and,

Figure 10 is a perspective view of the gyroscope used in the present invention.

Figure 5:
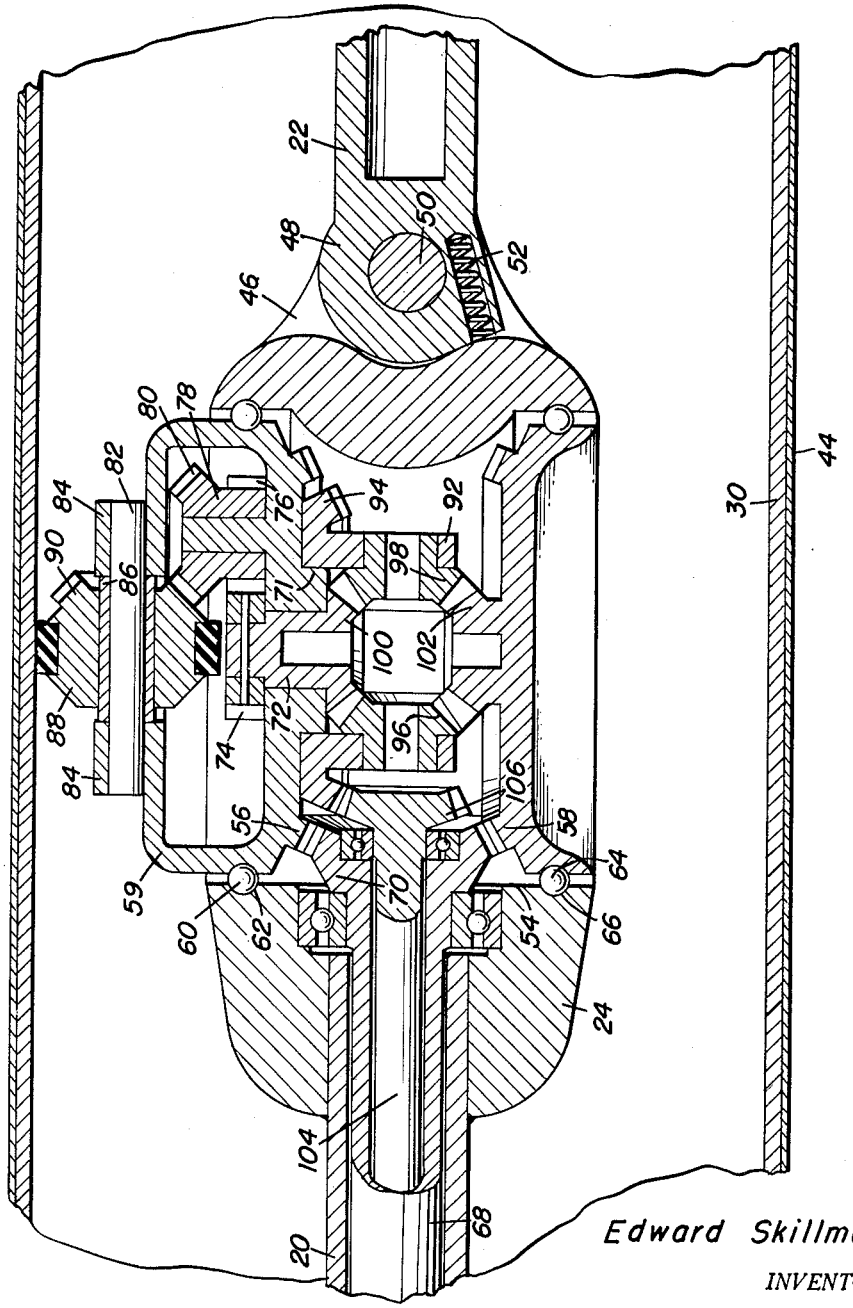
Figure 5 is an enlarged detail longitudinal vertical sectional view taken substantially on the plane of section line 5—5 of Figure 3.
Figure 6:
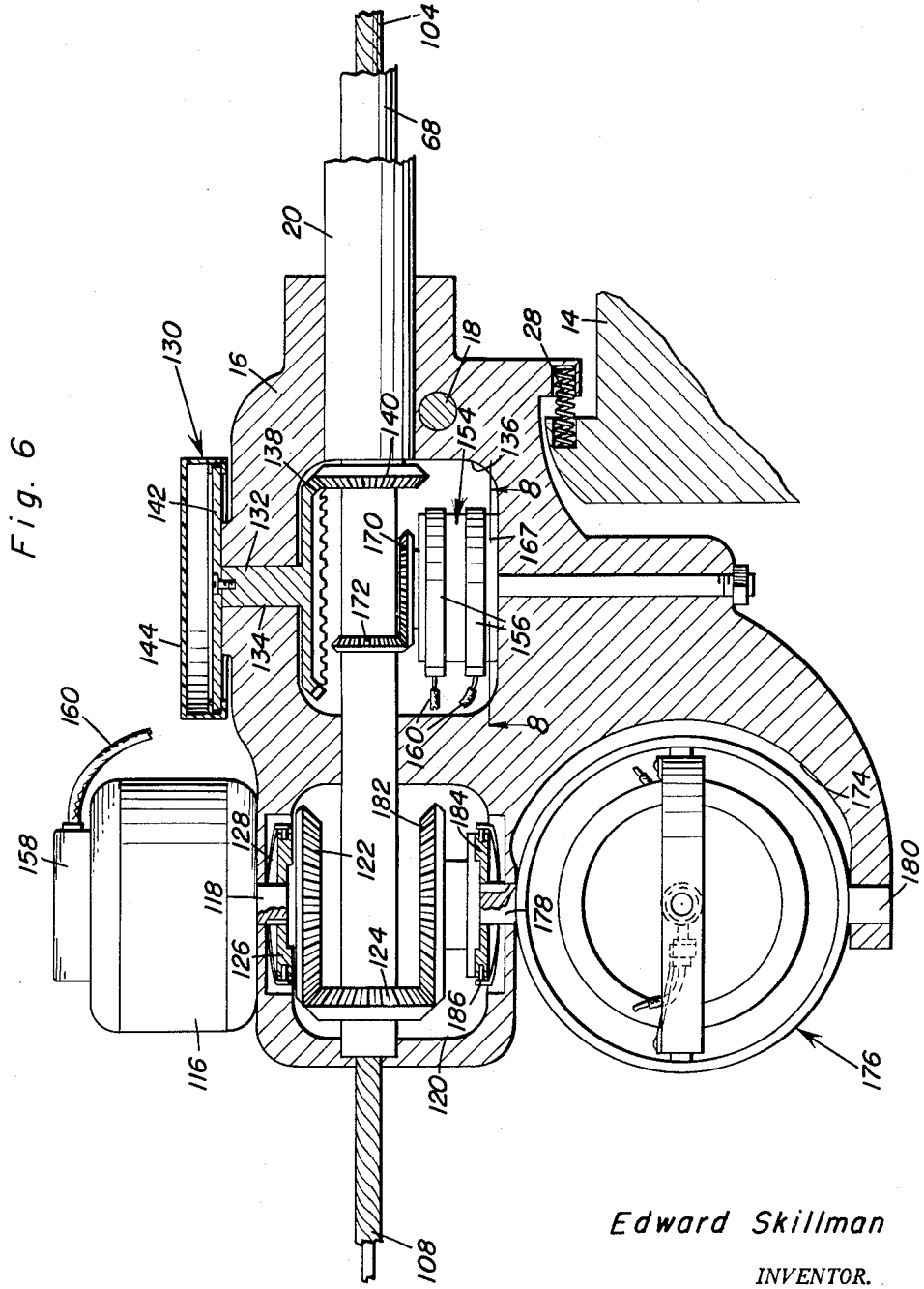
Figure 6 is an enlarged fragmentary longitudinal vertical sectional view taken substantially on the plane of section line 6—6 of Figure 1.

Referring now to the drawings in detail, wherein for the purpose of illustration, there is disclosed a preferred embodiment of the present invention, the numeral 10 represents a support having a base portion 12 that is suitably removably secured to a supporting structure. The base portion 12 is provided with an upwardly extending arm 14 to which a shaft holding member 16 is pivotally secured by a horizontal pivot 18.

A pair of coaxial tubular shafts 20 and 22 form part of the support 10. The inner adjacent ends of the shafts 20 and 22 are joined by a connecting and holding member 24. The outer end of shaft 20 is suitably secured to holding member 16. A latch spring 26 secured to and extending upwardly from the base portion 12 is adapted to engage the outer end of shaft 22 to retain the shafts 20 and 22 in a horizontal position.

A coil spring 28 is biased between the arm 14 and the holding member 16 to urge the latter upwardly about the pivot 18 so that when latch spring 26 is released from shaft 22, spring 28 will raise the member 16 and shafts 20 and 22, as shown in Figure 4.

A sheet holding cylinder 30 is slidably and rotatably supported upon the shafts 20 and 22. Ball joints 32 on the end walls of the cylinder 30 are slidably and rotatably positioned on the shafts 20 and 22. Shafts 20 and 22 also support a U-shaped scriber holder 34 having clamping sleeves 36 at its ends which are engaged about the shafts 20 and 22. The central portion of holder 34 is formed with a socket 38 in which a scriber 40 is adjustably held by a set screw 42, or other such means whereby the scriber will contact a sheet of paper or the like 44 that is suitably retained about the outer periphery of cylinder 30.

Member 24 is elongated and hollow and has one end rigidly secured to the shaft 20. The other end of member 24 is formed with a pair of ears 46 that are pivoted to the inner eye end 48 of shaft 22 by a horizontal pin 50. A light coil spring 52 in a recess in eye end 48 engages member 24 and yieldingly maintains shaft 22 coaxial with shaft 20.

Member 24 is provided with a central vertical opening 54 in which upper and lower beveled gears 56 and 58 are disposed for rotation. The hollow body 59 of gear 56 engages ball bearings 60 received in an upper series of recesses 62 in the wall of opening 54 and the body of gear 58 engages ball bearings 64 in a lower series of recesses 66 in the wall of opening 54.

A tubular driven shaft 68 extends through the shaft 20 and its inner end enters opening 54 and carries a beveled gear 70 that meshes with gears 56 and 58 to rotate the gears 56 and 58 in relatively opposite directions. The lower wall of body 59 is formed with a hub 71 that rotatably receives a stub shaft 72. The upper end of stub shaft 72 removably supports a gear 74 that meshes with the lower gear portion 76 of a gear member 78.

Gear member 78 is rotatably supported within the gear body 59 to rotate about a vertical axis and its upper end is formed with a beveled gear 80. A horizontal pin 82 has ends which are held in sleeves 84 on the upper wall of gear body 59. Pin 82 extends through a bearing 86 in the hub of a friction wheel 88. The peripheral edge of friction wheel 88 has a rubber tire thereon that engages the inner periphery of the cylinder 30. A beveled gear 90 formed with the friction wheel 88 and concentric with the pin 82, meshes with the beveled gear 80.

Hub 71 rotatably supports the cylindrical body portion 92 of a beveled gear 94. Body portion 92 is provided with a pair of diametrically opposed apertures in which the shank portion of beveled gears 96 and 98 are rotatably positioned. The gears 96 and 98 mesh with a beveled gear 100 at the lower end of stub shaft 72. Gear 58 is formed with a central beveled gear portion 102 that meshes with the gears 96 and 98 diametrically opposite from the gear 100.

A power driven rod or shaft 104 extends axially through driven shaft 68 and has a beveled gear 106 at its inner end that meshes with beveled gear 94 to impart rotation to the latter.

If gear 58 is stationary and shaft 104 is rotating, gear 94 is rotated and the mitre gears 96 and 98 will be carried about by gear 94 and as these mitre gears 96 and 98 mesh with the gear 100, the latter will be rotated twice as many revolutions as gear 94. Therefore, gear 106 of shaft 104 drives friction wheel 88, regardless of the positions of large beveled gears 56 and 58, since the drive is through a differential comprised of the gears 96, 98, 100, and 102.

In the event that shaft 104 is stationary while shaft 68 is rotating, then gears 56 and 58 are rotated by gear 70 in relatively opposite directions and friction wheel 88 is swung bodily around in one direction or the other, but it does not turn on its supporting pin 82 because the small pinion 102 which is integral with large gear 58, turns with gear 58, and gear 74 turns at the same rate as gear 56, and in the same direction, so there is no relative motion between gears 74 and 56.

Friction wheel 88 can be swung around 360 degrees, and since it can be driven in any position it may have, it can drive drum or cylinder 30 in any direction, either rotating cylinder 30 or moving cylinder 30 axially, or with any combination of these motions.

Means is provided whereby the shafts 68 and 104 may be rotated to impart movement and/or rotation to cylinder 30. The means for rotating the shaft 104 may comprise a speedometer cable 108 if the device is mounted in a vehicle or cable rotated by the power plant of the supporting structure for the recorder.

A gear mechanism (not shown) in a ratio changer 110 comprises means coupling the cable 108 to the shaft 104. The ratio changer 110 has a slide pointer 112 which registers with indicia 114 on the ratio changer to indicate the speed at which shaft 104 is rotated by cable 108. The ratio changer 110 may be of any suitable known structure whereby one gear of a series of gears fixed to cable 108 may mesh with selected gears of a series of gears on the shaft 104.

The means for rotating the shaft 68 comprises a reversible electric motor 116 fixedly carried by member 16 and having an armature shaft 118 that extends into a recess 120 in member 16 to journally support a beveled gear 122. The gear 122 meshes with a beveled gear 124 fixed on the shaft 68 so that when gear 122 is locked to shaft 118, the shaft 68 will be rotated. A clutch member 126 is keyed on the shaft 118 and is provided with an operating arm 128 which extends outwardly from member 16 whereby the clutch member 126 may be moved selectively into and out of clutching engagement with the gear 122.

A direction indicator 130 is supported on member 16 and includes a stub shaft 132 that extends through an opening 134 in member 16 into a chamber 136 formed in member 16. The lower end of stub shaft 132 is formed with a beveled gear 138 that meshes with a beveled gear 140 fixed on shaft 68 and the upper end of shaft 132 is provided with a flanged portion 142 that rotatably supports the transparent case 144 of indicator 130.

A compass unit designated generally by numeral 154 is supported within chamber 136 and its case 167 is embraced by slip rings 156 that are electrically connected to the relay 158 of motor 116 by conductors 160. The rings 156 are connected to conductive screws 162 and 164 that will be selectively engaged by the conductive compass needle 166 when the needle 166 is not pointing directly north, so that the electric circuit to motor 116 will be completed when needle 166 is not pointing north, however, when the needle 166 is pointing north then the needle 166 will eventually be spaced from the conductive screws 162 and 164. The compass 166 is grounded to the frame 16, but conductors 162 and 164 are insulated from frame 16.

The compass case 167 fixedly supports a beveled gear 170 meshes with a beveled gear 172 fixed on shaft 68. The ratio of the gears 170 and 172 is preferably 2 to 1, which is similar to the ratio of gear 56 and gear 58 to gear 70.

The member 16 is provided with a cut-out portion 174 in which there is disposed a gyrocompass 176 having upper and lower vertical trunnions 178 and 180 that enter accommodating apertures in the member 16. The upper end of trunnion 178 extends upwardly into the recess 120 and journally supports a beveled gear 182 that meshes with gear 124. A clutch member 184 keyed on trunnion 178 is provided with an operating arm 186, whereby the clutch member 184 may be forced into or out of clutching engagement with gear 182.

Gyrocompass 176 has a power driven wheel or disc turning at high velocity and the supporting ring of the gyrocompass confines the spinning axis to a horizontal plane so that the earth's rotation causes it to tend to assume a position parallel to the earth's axis, and thus point to the true north.

The power drive for the wheel or disc of the gyrocompass may be an electric drive or it may be driven by compressed air or other such similar means. Usually the power for both the electric motor and the gyrocompass will be supplied by wires leading to the electric battery or the electric generator on the vehicle or machine by which the course recorder is being carried. However, this drive will be entirely independent of the motor used for the control by means of the compass. The wheel of the gyrocompass is driven only when the gyroscope is to be used to control the course recorder and not when the compass control is being used.

It is intended that the rotor of the gyrocompass be made to act like the armature of a motor, or there is an air driven wheel connected to the rotor or the rotor shaft of the gyrocompass, since it will be quite difficult to use a connected drive from an outside power source. The rotor of the gyrocompass is carried in a gimbal, so that it is free to float in all directions except as it is confined by the gear on the vertical axis. This axis is also in position to rotate, but it must carry the gear 182 with it, and in so doing, it must turn shaft 68, which orients the friction wheel inside the cylinder.

The pair of electrical wires leading to the compass case 154 are connected by brushes to the contacts 162 and 164, and the needle 166 is grounded so that the circuit to the power means 116 will be complete only when the needle 166 engages one of the contacts either 162 or 164. When needle 166 engages contact 162, the armature shaft 118 of motor 116 will rotate in one direction and when needle 166 engages contact 164, the armature shaft of motor 116 will rotate in an opposite direction.

When needle 166 is not in contact with either contact 162 or 164, as when the compass is pointing north, and the case is in such a position that neither contact 162 or 164 touches the compass needle, no current is supplied to motor 116 and the friction wheel 88 is not changing its direction. As soon as the compass case 167 is swung toward the right or left, by the motion of the structure carrying the course recorder, contact of needle with contact 162 or 164 is made, and the friction wheel is oriented in the proper direction to draw the line on the chart so as to make it indicate the true direction in which the chart recorder is being carried.

The compass case will preferably be filled with an insulating fluid, which will help to keep the compass from swinging freely about when it is struck by one of the contacts 162 and 164.

What is claimed as new is as follows:

1. A course recorder comprising a sheet holding cylinder, a support for the cylinder including a pair of coaxial shafts, means at the ends of said cylinder slidably and rotatably engaging the shafts whereby the cylinder may slide and rotate, a holding member connecting the adjacent ends of said shafts and including a vertically rotating portion, a horizontally rotating friction wheel carried by said vertically rotating portion and engaging the inner periphery of said cylinder, means operatively connected to said friction wheel for rotating the friction wheel, and direction controlled means operatively connected to said vertically rotating portion to orient the latter in accordance with the course being traveled, said direction controlled means including a gyroscope, said direction controlled means including a compass controlled reversible electric motor and a gyrocompass, and independent clutch means for said gyrocompass and said motor.

2. A course recorder comprising a sheet holding cylinder, a support for the cylinder including a pair of coaxial shafts, means at the ends of said cylinder slidably and rotatably engaging said shafts, said support including a base portion and a vertically swingable element pivoted to said base portion and holding one of said shafts, means engaging said element and urging said shafts and said cylinder to a vertically inclined position, means engaging the other shaft to retain the shafts and cylinder in a horizontal position, a holding member connecting the adjacent ends of said shafts and including a vertically rotating portion, a horizontally rotating friction wheel carried by said vertically rotating portion, engaging the inner periphery of said cylinder to slide and/or rotate the cylinder, means operatively connected to the friction wheel for rotating the latter, and direction controlled means operatively connected to the vertically rotating portion to retain the latter oriented with respect to the course being traveled.

3. A course recorder comprising a sheet holding cylinder, a support for the cylinder including a pair of coaxial shafts, means at the ends of said cylinder slidably and rotatably engaging said shafts, said support including a base portion and a vertically swingable element pivoted to said base portion and holding one of said shafts, means engaging said element and urging said shafts and said cylinder to a vertically inclined position, means engaging the other shaft to retain the shafts and cylinder in a horizontal position, a holding member connecting the adjacent ends of said shafts and including a vertically rotating portion, a horizontally rotating friction wheel carried by said vertically rotating portion engaging the inner periphery of said cylinder to slide and/or rotate the cylinder, means operatively connected to the friction wheel for rotating the latter, and direction controlled means operatively connected to the vertically rotating portion to retain the latter oriented with respect to the course being traveled, said friction wheel rotating means including a power driven shaft, and differential gearing connecting said power driven shaft to said friction wheel to drive the friction wheel to some selected scale, in proportion to the distance traveled.

4. A course recorder comprising a sheet holding cylinder, a support for the cylinder including a pair of coaxial shafts, means at the ends of said cylinder slidably and rotatably engaging said shafts, said support including a base portion and a vertically swingable element pivoted to said base portion and holding one of said shafts, means engaging said element and urging said shafts and said cylinder to a vertically inclined position, means engaging the other shaft to retain the shafts and cylinder in a horizontal position, a holding member connecting the adjacent ends of said shafts and including a vertically rotating portion, a horizontally rotating friction wheel carried by said vertically rotating portion engaging the inner periphery of said cylinder to slide and/or rotate the cylinder means operatively connected to the friction wheel for rotating the latter, and direction controlled means operatively connected to the vertically rotating portion to retain the latter oriented with respect to the course being traveled, said one of said shafts being tubular, a power driven shaft extending through said tubular shaft, and differential gearing connecting said power driven shaft to said friction wheel and forming said friction wheel rotating means.

5. A course recorder comprising a sheet holding cylinder, a support for the cylinder including a pair of coaxial shafts, means at the ends of said cylinder slidably and rotatably engaging said shafts, said support including a base portion and a vertically swingable element pivoted to said base portion and holding one of said shafts, means engaging said element and urging said shafts and said cylinder to a vertically inclined position, means engaging the other shaft to retain the shafts and cylinder in a horizontal position, a holding member connecting the adjacent ends of said shafts and including a vertically rotating portion, a horizontally rotating friction wheel carried by said vertically rotating portion engaging the inner periphery of said cylinder to slide and/or rotate the cylinder, means operatively connected to the friction wheel for rotating the latter, and direction controlled means operatively connected to the vertically rotating portion to retain the latter oriented with respect to the course being traveled, said direction controlled means including a compass having a needle and a needle holding spindle, an electric motor connected to the vertically rotating portion, and a switch connected to the motor and the spindle to be actuated to a circuit open position when the needle is pointing north and after the vertically rotating portion has been oriented until the electrical connection between the compass needle and its contact points has been broken.

6. A course recorder comprising a sheet holding cylinder, a support for the cylinder including a pair of coaxial shafts, means at the ends of said cylinder slidably and rotatably engaging said shafts, said support including a base portion and a vertically swingable element pivoted to said base portion and holding one of said shafts, means engaging said element and urging said shafts and said cylinder to a vertically inclined position, means engaging the other shaft to retain the shafts and cylinder in a horizontal position, a holding member connecting the adjacent ends of said shafts and including a vertically rotating portion, a horizontally rotating friction wheel carried by said vertically rotating portion engaging the inner periphery of said cylinder to slide and/or rotate the cylinder, means operatively connected to the friction wheel for rotating the latter, and direction controlled means operatively connected to the vertically rotating portion to retain the latter oriented with respect to the course being traveled, said friction wheel rotating means including a driven shaft and a ratio changing gear mechanism operatively connected to the driven shaft to vary the speed at which the driven shaft is being rotated.

References Cited in the file of this patent

UNITED STATES PATENTS

| Number | Name | Date |
|---|---|---|
| 1,427,267 | Lavand | Aug. 29, 1922 |
| 1,493,473 | Colley | May 13, 1924 |
| 1,701,582 | Mengden | Feb. 12, 1929 |
| 2,369,922 | Shamak | Feb. 20, 1945 |
| 2,424,118 | Rast | July 15, 1947 |
| 2,437,243 | Curtis | Mar. 9, 1948 |
| 2,670,414 | White | Feb. 23, 1954 |